United States Patent
Sharangpani

[19]

[11] Patent Number: 6,154,760
[45] Date of Patent: *Nov. 28, 2000

[54] INSTRUCTION TO NORMALIZE REDUNDANTLY ENCODED FLOATING POINT NUMBERS

[75] Inventor: Harshvardhan Sharangpani, Santa Clara, Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/562,899

[22] Filed: Nov. 27, 1995

[51] Int. Cl.[7] .................................. G06F 7/00; G06F 7/38

[52] U.S. Cl. ........................................... 708/205; 748/495

[58] Field of Search ......................... 364/715.03, 715.04, 364/715.1, 736, 736.5, 745, 748; 708/204, 205, 211, 495

[56] References Cited

U.S. PATENT DOCUMENTS

| | | | |
|---|---|---|---|
| 4,991,130 | 2/1991 | Kojima | 364/715.04 |
| 4,994,996 | 2/1991 | Fossum et al. | 364/715.04 X |
| 5,357,237 | 10/1994 | Bearden et al. | 364/748 X |
| 5,481,686 | 1/1996 | Dockser | 395/563 |
| 5,504,912 | 4/1996 | Morinaga et al. | 395/800 |

*Primary Examiner*—Ohuong Dinh Ngo
*Attorney, Agent, or Firm*—Blakely, Sokoloff, Taylor & Zafman LLP

[57] ABSTRACT

The present invention is an apparatus to normalize a floating point number. The apparatus has a first storage area comprising the floating point number. The floating point number comprises an exponent field and an explicit bit. The apparatus further comprises a circuit to normalize the floating point number when the explicit bit is not set and the exponent field has a first predetermined value identifying a redundant denormal encoding of the floating point number. Otherwise the encoding of the number is not changed by the circuit.

22 Claims, 4 Drawing Sheets

INSTRUCTION TO NORMALIZE REDUNDANTLY ENCODED FLOATING POINT NUMBERS

BACKGROUND

1. Field of the Invention

The invention relates to the field of floating point numbers, and more particularly to the storage of floating point numbers in a digital computer system.

2. Art Background

An exemplary microprocessor, such as the Pentium™ brand processor which is a product of Intel® Corporation, Santa Clara, Calif., represents real numbers of the form $(-1)s2E(b0.b1b2b3 \ldots bp-1)$ where:
s=0 or 1
E=any integer between Emin and Emax, inclusive
bi=0 or 1
p=number of bits of precision Table 1a summarizes the parameters for each of the three real-number formats. The Pentium brand processor stores real numbers in three-field binary format that resembles scientific, or exponential notation. The significand field, b0b1b2b3 ... bp-1, is the number's significant digits. (The term "significand" is analogous to the term "significand" used to describe floating-point numbers on some computers.) The exponent field, e+E=bias, locates the binary point within the significant digits (and therefore determines the number's magnitude). (The term "exponent" is analogous to the term "characteristic" used to describe floating-point numbers on some conventional computers.) A 1-bit sign field indicates whether the number is positive or negative. Negative numbers differ from positive numbers only in the sign bits of their significands.

TABLE 1a

|  | Single | Double | Extended |
|---|---|---|---|
| Total Format Width | 32 | 64 | 80 |
| p (bits of precision) | 23 | 53 | 64 |
| Exponent bits | 8 | 11 | 15 |
| Emax | +127 | +1023 | +16383 |
| Emin | -126 | -1022 | -16382 |
| Exponent Bias | +127 | +1023 | +16383 |

The single real format is appropriate for applications that are constrained by memory, but it should be recognized that this format provides a smaller margin of safety. It is useful for the debugging of algorithms, because roundoff problems will manifest themselves more quickly in this format. It is often used in graphics applications as well. For most microcomputer applications over the last decade, the double real format has provided sufficient range and precision to return correct results with a minimum of programmer attention. Most processors have optimized their computational paths to provide the maximum performance on operations on the double real format. The extended real format was originally developed with an intent to hold intermediate results, loop accumulations, and constants. Its extra length was designed to shield final results from the effects of rounding and overflow/underflow in intermediate calculations.

As microprocessor performance increases (by taking advantage of the improvements in the technology of Very Large Scale Integration), applications develop that exploit this increase in performance to deliver more utility. These new applications operate on larger data sets and invoke more complex calculations that are more prone to roundoff errors. The extended format is useful in these applications, not just as an intermediate format, but also as a format for input and output operands. With the need to support the extended format as outlined above, future processors must now be designed to support computation on three real number floating point formats in their computational paths.

The floating point unit (FPU) of the processor usually retains floating point numbers in normalized form. This means that, except for the value zero, the significand contains an integer bit and fraction bits as follows:
1.fff . . . ff
where "." indicates an assumed binary point. The number of fraction bits varies according to the real format: 23 for single, 52 for double, and 63 for extended real. By normalizing real numbers so that their integer bit is always a 1, the processor eliminates leading zeros in small values. This technique maximizes the number of significant digits that can be accommodated in a significand of a given width. Note that, in the single and double formats, the integer bit is implicit and is not actually stored in memory; the integer bit is physically present (explicit) in the extended format only.

If one were to examine only the significand with its assumed binary point, all normalized real numbers would have values greater than or equal to one and less than two. The exponent field locates the actual binary point in the significant digits. Just as in decimal scientific notation, a positive exponent has the effect of moving the binary point to the right, and a negative exponent effectively moves the binary point to the left, inserting leading zeros as necessary. An unbiased exponent of zero indicates that the position of the assumed binary point is also the position of the actual binary point.

The exponent field, then, determines a real number's magnitude. In 25 order to simplify comparing real numbers (e.g., for sorting), the processor stores exponents in a biased form. This means that a constant, called a bias, is added to the true exponent described above. As Table 1a shows, the value of this bias is different for each real format. The bias is chosen so as to force the biased exponent to be a positive value. A number's true exponent can be determined simply by subtracting the bias value of its format. In the 80×86™ family of processors, a product of Intel Corporation, the single and double real formats exist in memory only. If a number in one of these formats is loaded into an FPU register, is automatically converted to extended format, the format used for all internal operations. Likewise, data in registers can be converted to single or double real for storage in memory.

When a numeric value becomes very close to zero, normalized floating-point storage cannot be used to express the value accurately. A number R is said to be tiny (also commonly referred to as subnormal) when $-2^{Emin}<R<0$ or $0<R<+2^{Emin}$. (For a typical case, Emin is -126 for single format, -1022 for double format, and -16382 for extended format.) In other words, a nonzero number is tiny if its exponent would be too negative to store in the destination format, while retaining the number in normalized form.

To accommodate these instances, the processor can store and operate on real numbers that are not normalized, i.e., whose significands contain one or more leading zeros. Denormals arise when the result of a calculation yields a value that is tiny.

Denormal values have the following properties:
The biased floating-point exponent is stored at its smallest value.
For single precision numbers, this minimum exponent value is -126. For double precision, the minimum exponent value is -1022.

For the extended precision format, the minimum exponent value is −16382.

For all formats, when the number is denormal the minimum exponent is encoded with a bit pattern of all zeros. The integer bit of the significand (whether explicit or implicit) is zero.

It is important to note that interpretation of the exponent encoding for denormal numbers differs from the interpretation of the exponent encoding for normalized numbers. For denormalized numbers, the exponent is encoded with the bit pattern of all zeros, although this pattern is interpreted to have a value which is the minimum exponent value (which is −126 for single format, −1022 for double real format, and −16382 for the extended real format). Hence, interpreting such denormal numbers by merely adding the bias of the format to the exponent encoding of the denormal number will produce an exponent value that is off by one. Remember, denormals and true zeros both have exponents encoded with all zeros, although the interpretation of these encodings differ.

As a number becomes smaller, it gradually transitions from a normal representation to a denormal representation. Table 1b below illustrates this process for a single precision number.

TABLE 1b

| Exponent Value | Significand Value (includes explicit bit) | Exponent Encoding | Significand Encoding (no explicit bit) | Description of number |
|---|---|---|---|---|
| 1. 0x3f81 | 1.0000000 . . . 01 | 00000001 | 0000000 . . . 01 | |
| 2. 0x3f81 | 1.0000000 . . . 00 | 00000001 | 0000000 . . . 00 | Smallest single precision normal |
| 3. 0x3f81 | 0.1111111 . . . 11 | 00000000 | 1111111 . . . 11 | Largest single precision denormal |
| 4. 0x3f81 | 0.1111111 . . . 10 | 00000000 | 1111111 . . . 10 | |
| 5. 0x3f81 | 0.0000000 . . . 01 | 00000000 | 0000000 . . . 01 | Smallest single precision denormal |
| 6. 0x0000 | 0.0000000 . . . 00 | 00000000 | 0000000 . . . 00 | True Zero |

Entry one in Table 1b shows a normal number which is very close to becoming denormal. Entry two shows the smallest possible normal number which can be stored in the single format. Entry three shows the denormal number which results when the normal number in entry two loses a value equal to one digit in the last place. The exponent of the number is encoded as zero, although its value remains at the minimum exponent for a single precision number. The significand bits are set to all ones. Entry five shows the smallest denormal number which can be represented by the single precision format.

Denormals typically receive special treatment by processors in three respects:

The processor avoids creating denormals whenever possible. In other words, it always normalizes real numbers except in the case of tiny numbers.

The processor provides the unmasked underflow exception to permit programmers to detect cases when denormals would be created.

The processor provides the unmasked denormal operand exception to permit programmers to provide a tailored response in the presence of denormal operands.

Denormalizing means incrementing the true result's exponent by a certain amount, and inserting a corresponding number of leading zeros in the significand, shifting the rest of the significand by the same amount to the right. Denormalization produces either a denormal or a zero. Normalization is the converse of this process, in which the bits of the significand are left-shifted until all leading zeros are eliminated, and the exponent of the result is decremented by a corresponding amount.

The denormalization process causes loss of precision if significant low-order bits are shifted off the right end of the significand field. In a severe case, all the significant bits of the true results are shifted off and replaced by the leading zeros. In this case, the result of denormalization yields a zero.

Typical prior art implementations map floating point data loaded from memory to the FPU from the originating format in memory to the extended format in the FPU registers. This mapping in the prior art has entailed, on a load instruction, a full conversion of the data from the originating format into the extended precision format. Likewise, on the store instruction, this has entailed a complete conversion of the data from the extended precision format (in the FPU register file) to the destination format of the result in memory.

In the prior art, conversion of the data on the load instruction typically includes the following:

Detection of denormal numbers in the originating format.

Generating an exception when the input operand is a denormal number and the denormal exception is unmasked.

Normalization of the denormal number in the event that the input operand is a denormal number and the denormal exception is masked.

Examination of the input operand to check whether it is encoded to have a special interpretation, such as a signaling Not-A-Number (NaN) encoding. If this is true, the FPU delivers an interrupt for the invalid operation exception when the invalid operation exception is unmasked.

As can be seen from the above, implementations on the prior art must examine the input operand being loaded in order to determine whether there will be any exceptions. Exceptions include the denormal operand exception response and the invalid operation exception response. Thus, implementations on the prior art incur data-related exceptions upon the loading of floating point operands.

In the event that the denormal operand exception is masked, prior art processors must normalize input operands which are denormal numbers. This normalization operation requires, among other circuits, a hardware shifter. Modern processors typically execute several load instructions in parallel, requiring potentially several dedicated shifters on the chip. Since dedicated hardware for multiple shifters is expensive in terms of silicon die cost, some implementations may use schemes by which several load paths to the FPU arbitrate for a single shifter, adding design complexity. A more common alternative is to complete the normalization process by invoking on-chip microcode. Upon determining that the data being loaded is denormal, a micro-exception delivers control to a microcode handler. The microcode handler uses existing shifters in the FPU (shifters necessary for supporting the floating point add operation, for example) to execute the normalization of the loaded operand. Thus, implementations on the prior art need to provide either dedicated shifters for each load path, added design complexity to arbitrate for a single shifter, or take a micro-exception to enable microcode to complete the normalization.

Modern pipelines processors employ techniques that include deep pipelining, as well as parallel instruction execution. These modern processors execute several instructions concurrently at each stage of the pipeline. Typically, a load operation on these processors takes several cycles to complete its execution. A common prior art technique is to enable execution of instructions following a load instruction even before the loaded data is returned, as long as the subsequent instructions do not depend upon the loaded data. To complete the execution of these subsequent instructions, and to update the architectural state of the FPU with the result of these instructions, it is important to determine that there are no exceptions or micro-exceptions on all prior instructions.

Because the FPU takes several cycles to complete a load instruction, and because the load instruction may incur data-related exceptions or micro-exceptions, it is necessary to temporarily retain the execution results of instructions following the load instruction in a buffer (sometimes called a retirement buffer). The results are retained until such time as any data-related exceptions or micro-exceptions incurred by the load instruction are determined. Because it takes several cycles to make this determination, and because modern processors execute several instructions in parallel, the number of instructions subsequent to the load that will execute before the determination is made may be very large. A very large retirement buffer is then required to store these pending results. The size of this buffer poses an appreciable cost both in terms of silicon die cost as well as design complexity.

Solutions that eliminate the possibility of data-related exceptions on loads will eliminate the need for such a buffer for the purposes of the load instruction. For the most common modern implementations, this will completely eliminate the need for the retirement buffer. Such implementations can employ a simple register scoreboard for the book-keeping of incoming load data.

For modern processors, a solution is needed that provides efficient computational support for the three memory formats (single, double, and extended) that accomodate denormalized numbers, simultaneously eliminating the following:

Data-related exceptions or data-related micro-exceptions during loading of floating point operands.

The need for one dedicated shifter per load path.

The need for complex arbitration hardware, in order to use a single shifter to support normalization of denormal numbers on multiple load paths.

Co-pending application, Ser. No. 08/759,050 filed on Dec. 2, 1996, now U.S. Pat. No. 6,058,410 describes a unified floating point format for denormal numbers in a computer system. For denormal numbers originating in the single and double precision formats, a value for the exponent of the unified format is selected which is equal to the sum of the minimum exponent value for the originating format and the exponent bias of the unified format. For example, when the minimum exponent of the originating format is −126 (single precision denormal numbers), and the bias of the unified format is +16383, the value 0x3f81 is selected for the exponent of the number in the unified format (16383d−126d=0x3f81). For double precision denormal numbers, the value 0x3c01 is selected for the exponent of the number in the unified format, using a similar computation and a minimum exponent value of −1022. Because the minimum exponent of denormal numbers in the single and double formats is encoded as zero, merely adding the unbiased exponent of the denormal number to the exponent bias of the unified format will not form an accurate exponent for the unified format. Instead, the minimum unbiased exponent value of the originating format must be added to the exponent bias of the unified format to generate a correct exponent value for the unified format.

The sign and mantissa fields of the number in the originating format are copied to the sign and significand fields of the unified format, and padded with zeros where necessary. The unified format contains an explicit integer bit which is set to zero when the number is denormal, and set to one when the number is normal.

The hardware costs associated with loading floating point numbers from computer memory, and the complexity of the load process when denormal numbers are encountered, are considerably reduced using the unified format. Denormal exceptions may be eliminated from the load instruction. Further, because denormal numbers are loaded without being normalized, the load path hardware is simplified by eliminating the need for normalizers. Design complexity is reduced by eliminating the need for arbitration logic when a single normalizer is used by multiple load paths. Also, data-related exceptions and micro-exceptions are no longer generated during operand load, which substantially reduces the size and complexity of the retirement buffer of the FPU in some implemenations, and eliminates the need for it entirely in others. Instead, these exceptions are generated at the time when the number is actually used as on operand by an executing instruction.

One consequence of not normalizing single and double precision denormal numbers is that, in the unified format, two encodings are possible for a subset of the floating point numbers. More specifically, the subset of $2^{23}$ single precision denormals (assuming 23 bits of significand) and $2^{52}$ double precision denormals (assuming 52 bits of significand) will have two possible encodings in the unified format. For example, consider the (denormal) single precision number $+2^{-126}*0.1110$. This number is denormal because the exponent is at the minimum value for the single precision format, and the implicit integer bit is zero. This number has two possible encodings in the unified format; denormalized and normalized. The denormalized encoding is $+2^{0x3f81}*0.1110$, where the exponent has been replaced with the sum of the minimum exponent value for the single precision format and the exponent bias of the unified format. The normalized format is $+2^{-127}*1.110$, where the number has been normalized by left-shifting the significand and decrementing the exponent.

Previous generations of computer processors may not support the unified format, which creates a compatibility issue in more modern processors that use the unified format. Modern processors may operate in different modes, each mode supporting a different Instruction Set Architecture (ISA). For example, a modern processor may operate in an enhanced mode, in which the processor supports additional instructions not supported by the earlier processors. In addition, when operating in the enhanced mode the processor may support the unified data format. The processor may switch its mode of operation during program execution from the enhanced mode to a 'legacy mode' which emulates the earlier generation processors. The legacy mode is fully compatible on program code written for the earlier processors. This legacy mode does not typically support the additional instructions and unified data format supported by the enhanced mode. A processor may effect such a mode switch when calling library routines written for the earlier generation processors, library routines which do not support the unified data format. A processor may call such routines to leverage off the vast amounts of program code developed for the earlier generation processors.

In situations where the unified format is supported by the enhanced mode but not by the legacy mode, it would be advantageous for an instruction to convert denormal numbers from the unified format to a format supported by the legacy mode. This special normalizing instruction could also be used within denormal operand exception handlers, to normalize denormal operands which caused a denormal operand exception when the denormal operand exception is unmasked. For use in an exception handler, the normalizing instruction itself should not incur any exceptions. To reduce the die size and circuit complexity of the FPU, the instruction should be implemented to take advantage of existing normalizing hardware within the FPU. As previously explained, normalization of denormals involves the left-shifting of the significand of the number with a corresponding adjustment to the exponent of the number. It would be advantageous if this property of adjusting the exponent of the number were used to implement other important computational operations inside the floating point unit, for example, a Find First Set Bit operation.

SUMMARY OF THE INVENTION

The present invention is an apparatus to normalize a floating point number. The apparatus has a first storage area comprising the floating point number. The floating point number comprises an exponent field and an explicit bit. The apparatus further comprises a circuit to normalize the number without incurring exceptions. The circuit normalizes the number only when the explicit bit is not set and the exponent field has a first predetermined value identifying a redundant denormal encoding of the floating point number, otherwise, the number is left unchanged by the circuit.

BRIEF DESCRIPTION OF THE DRAWINGS

The features and advantages of the present invention will be apparent from the accompanying drawings and from the detailed description of the present invention as set forth below.

DETAILED DESCRIPTION

In the following descriptions, numerous specific details are set forth such as circuits, flow diagrams, etc, in order to provide a thorough understanding of the present invention. In other instances, well-known structures and techniques have not been shown in detail because to do so would unnecessarily obscure the present invention.

The present invention involves an instruction for normalizing floating point numbers formatted in the unified data format, described above in the background section. The instruction is herein denoted by the symbol "FNORM", which is illustrative of the purpose of the instruction, which is to normalize floating point numbers. The FNORM instruction of the present invention eliminates redundant encodings of denormal numbers in the unified floating point format. The FNORM instruction does not incur exceptions while normalizing redundantly encoded denormal numbers, which makes it especially suitable for use in denormal operand exception handlers. The FNORM instruction also finds a useful application in the implementation of the Find First Set Bit function, explained below in FIG. 4.

Figure 1A:
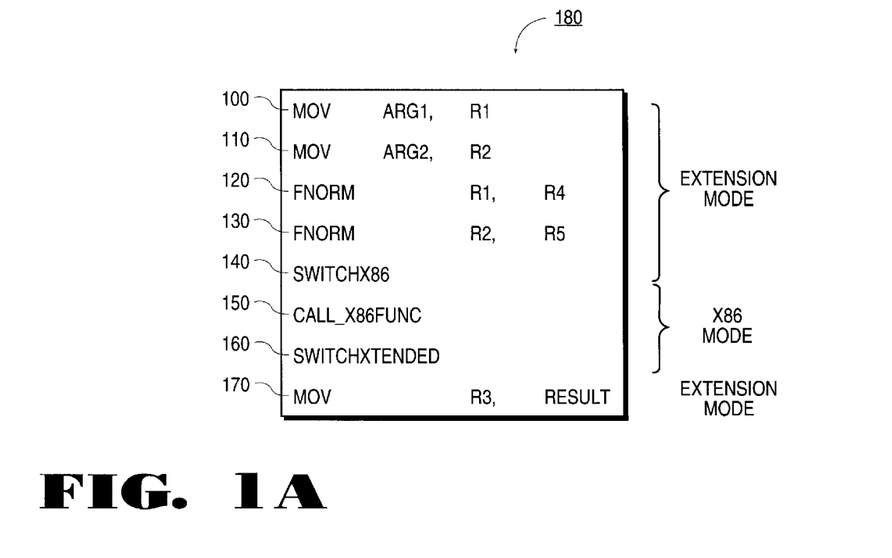
FIG. 1A shows a computer memory comprising one embodiment of the present invention, in which the FNORM instruction is used to normalize redundantly encoded denormal numbers for use by an x86-mode (legacy mode) function.

FIG. 1A shows a computer memory 180 comprising one embodiment of the present invention, in which the FNORM instruction is used to normalize redundantly encoded denormal numbers for use by an x86-mode function. The computer memory 180 comprises a series of instructions for executing on a computer processor. The first instruction 100 moves a number represented by ARG1 from computer memory to register R1. The next instruction 110 moves a second number represented by ARG2 from computer memory to register R2. FNORM instruction 120 then normalizes the number in register R1, placing the normalized result in register R4, but only if the number is denormal and redundantly encoded. FNORM instruction 130 normalizes the number in register R2 and places the normalized result in register R5. By normalizing redundantly encoded numbers in registers R1 and R2 using FNORM, the program insures that the numbers are in a format which is suitable for use by x86-mode instructions executed by prior generation processors. In other words, FNORM eliminates redundant encodings of denormal numbers which are not supported by the x86-mode instructions. Instruction 140 effects a mode switch from the enhanced mode to the X86 mode. Instruction 150 calls a function written for X86-mode. This function uses the data values in registers R4 and R5 as inputs and computes an output number which is placed in register R3. Once the x86 mode function has completed its operation on the numbers in registers R4 and R5, the program switches back from x86 mode into the enhanced mode using instruction 160. Once the program is back in the enhanced mode, instruction 170 moves the output number in register R3 to the destination location denoted by the symbol "RESULT."

Alternate embodiments are possible, for example each FNORM instruction may be executed immediately after the instruction which loads the number into a register. In the preferred embodiment, the FNORM instruction operates on a number in a source register or memory location and places the normalized number in a destination register or memory location. In an alternate embodiment, FNORM operates "in place" on a number in a register, i.e. the normalized number is placed back into the source register. Those skilled in the art will appreciate that the operands of FNORM may specify numbers in registers or computer memory for either source, destination, or both, without departing from the scope of the invention.

FNORM instructions 120 and 130 are also useful for normalizing dernormal operands in situations where no mode switch is performed by the program. When FNORM is used in-line with the program code as in FIG. 1A, then no denormal exceptions will occur upon using the operands. If there is a high probability that the operands will be denormal, then normalizing them using FNORM instructions in-line may achieve a performance benefit over invoking the denormal operand exception and vectoring to an exception handler each time a denormal operand is encountered. Note that for normal operands, and for denormal operands which originate in the extended precision format, each in-line FNORM instruction is a NOP which does not change the contents of the register. For normal operands and denormals originating in the extended format, each in-line FNORM instruction incurs a performance penalty equal to the number of clock cycles required to execute the FNORM instruction.

Figure 1B:
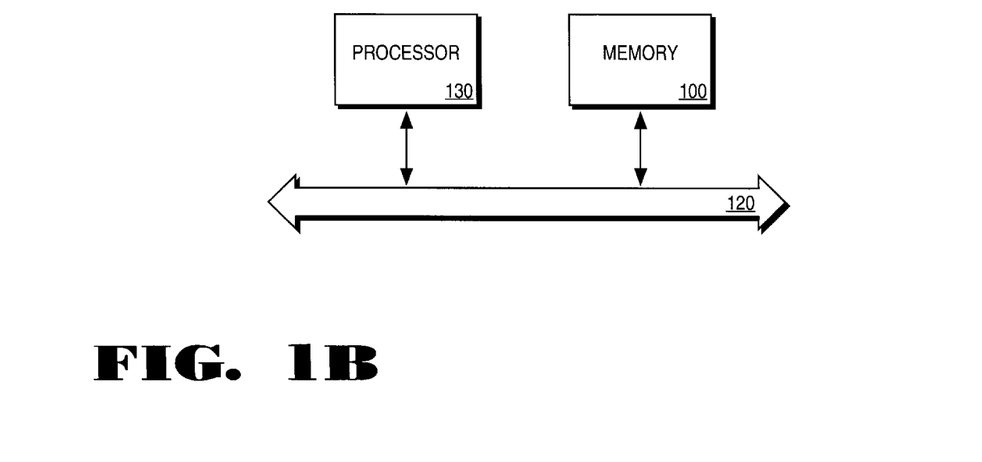
FIG. 1B shows an exemplary computer system in which the present invention may be disposed.

FIG. 1B shows an exemplary computer system in which the present invention may be disposed. Instructions are typically stored in a memory such as the one shown in element 100, corresponding to memory element 180 in FIG. 1A, in which instructions, including the FNORM instruction of the present invention, are stored. The memory 100 may be a Random-Access-Memory (RAM), a cache memory, a Read-Only-Memory (ROM), a flash memory, or any other form of memory device which is capable of storing instructions which are executed by a processor element 130. Instructions are typically supplied to the processor 130 over bus element 120. In FIG. 1B, the memory 100 and the processor 130 are shown as separate elements, however, one skilled in the art of computer systems will readily appreciate that the memory 100 and the processor 130 may be combined into a single integrated device, such as with on-chip flash memories. In addition to storing instructions for execution on the processor, memory 100 may also store data to use with those instructions (such as the data elements denoted in FIG. 1A by the symbols ARG1, ARG2, and RESULT) and temporary variables and other intermediate information resulting from execution of those instructions. One skilled in the art will also appreciate that bus element 120 may be implemented in numerous ways familiar in the art of processor system design, for example, using an electrically conductive material, or using optical coupling.

Figure 2A:
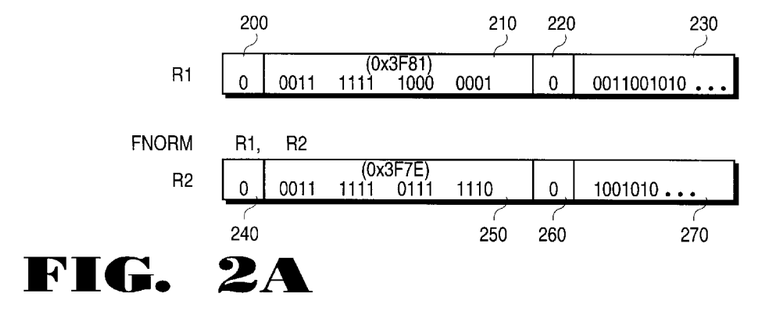
FIG. 2A shows register R1 containing a redundantly encoded denormal number originating in the single precision format, and also register R2 which contains the result of executing the FNORM instruction on the number in register R1.

FIG. 2A shows register R1 containing a redundantly encoded denormal number originating in the single precision format, and also register R2 which contains the result of executing the FNORM instruction on the number in register R1. Before FNORM is executed on the contents of the register, the exponent 210 of the number in register R1 is set to the sum between the minimun exponent value of the single precision format and the exponent bias for the unified data format, and is non-zero. Also, the explicit bit 220 is set to 0, in other words, the significand has leading zeros. When executing in enhanced mode, this signifies to FNORM that the number is a redundant, denormal encoding of a number originating in the single precision floating point format. In the preferred embodiment, the sum between the minimun exponent value of the orginating format and the exponent bias for the unified data format is 0x3f81 when the number originates from the single precision format. Also in the preferred embodiment, the sum between the minimun exponent value of the orginating format and the exponent bias for the unified data format is 0x3C01 when the number originates from the double precision format. After the FNORM instruction is executed on the number in register R1, the result is placed in register R2. The significand 230 of the number in register R2 is left-shifted by three positions to eliminate leading zeros in new significand 270, so that new explicit bit 260 is set to one. The exponent 210 is decremented by one for each bit position which the significand 230 is left-shifted, so that new exponent 250 is set to 0x3F7E. The new sign bit 240 of the number is unaffected by the FNORM instruction.

Figure 2B:
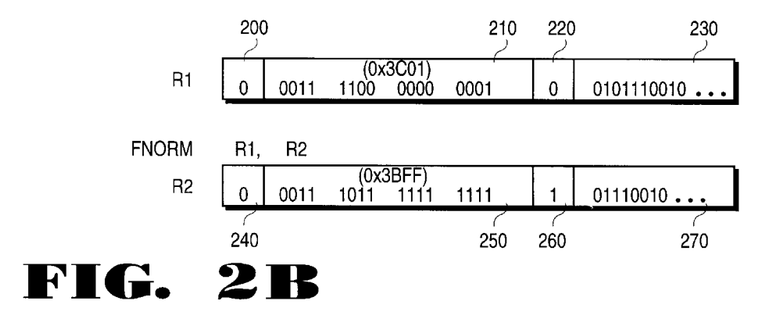
FIG. 2B shows register R1 containing a redundantly encoded denormal number originating in the double precision format, and also register R2 which contains the result of executing the FNORM instruction on the number in register R1.

FIG. 2B shows the same registers R1 and R2, this time containing a redundantly encoded, denormal number originating in the double precision format, both before and after the FNORM instruction is executed on the register R1. In FIG. 2B, sign bit 200 of the number in register R1 is set to zero and exponent field 210 is set to 0x3C01 before FNORM is called. Explicit bit 220 is set to zero, indicating that the significand 230 has leading zeroes. The value 0x3C01 for the exponent 210 is in the preferred embodiment the difference between the minimum exponent value of the double precision floating point format and the exponent bias of the unified format. After FNORM is executed on register R1, new sign bit 240 of the number in register R2 is unchanged. The instruction recognizes that the number is a redundant, denormal encoding of a number originating in the double precision format, and normalizes the number by left-shifting the significand 230 to eliminate leading zeros. The new exponent 250 has the value 0x3BFF, which is the result of decrementing the exponent 210 by one for each left-shift of the significand 230 by one bit position. New explicit bit 260 is set to one, because leading zeroes have been eliminated from the new significand 270.

FIG. 2C again shows registers R1 and R2, this time containing a denormal number originating in the extended precision format, both before and after the FNORM instruction is executed on the register. Before executing FNORM, the sign bit 200 of the number in register R1 is zero, the exponent 210 has the value zero, and the explicit bit 220 is zero. Significand 230 has some non-zero bits. The FNORM instruction recognizes a number with this format as a denormal number originating from the extended format. In the unified data format, denormal numbers originating from the extended precision format are not redundantly encoded. After FNORM is executed, the new sign 240, new exponent 250, new explicit bit 260 and new significand 270 of the number in register R2 remain unchanged from their values before FNORM is executed on the number in register R1. The denormal extended precision number cannot be normalized because both the unified data format and the originating (extended) data format have the same number of exponent bits and the same number of significand bits. Therefore, the FNORM instruction does not change the encoding of the number the register R1. After FNORM is executed, the new sign bit 240 of the number in register R2 is still zero, the new exponent 250 is still zero, and the new explicit bit 260 is still zero. Also, the significand 270 still contains leading zeroes.

Figure 2C:
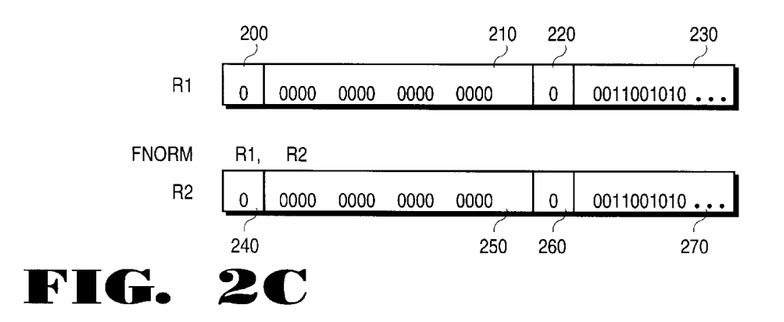
FIG. 2C shows register R1 containing a redundantly encoded denormal number originating in the extended precision format, and also register R2 which contains the result of executing the FNORM instruction on the number in register R1.

If the register R1 contains a true zero, that is, if the significand bits are all set to zero, then the FNORM instruction will not change the encoding of the number in the register. The FNORM instruction will not change the encoding of the number in this case because a true zero cannot be normalized.

Figure 2D:
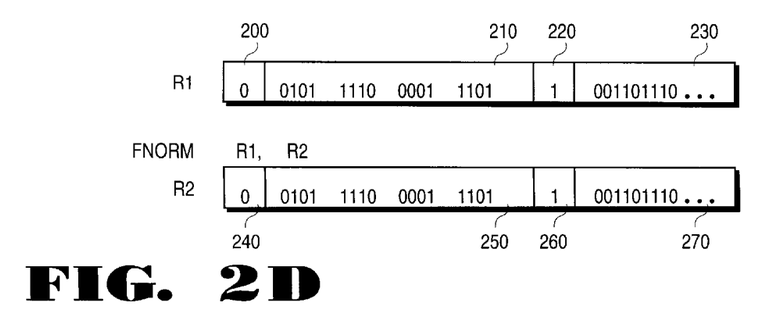
FIG. 2D shows registers R1 and R2 containing a normal number both before and after FNORM instruction is executed on the register.

FIG. 2D shows registers R1 and R2 containing a normal number, both before and after the FNORM instruction is executed on the number in register R1. Before FNORM is executed, the sign bit 200 of the number in register R1 is zero, the exponent 210 has a non-zero value which is not recognized by FNORM as the exponent of a redundantly encoded denormal number. In particular, the value of exponent 210 is neither the value 0x3F81 nor is it the value 0x3C01. Further, the explicit bit 220 is set to one, indicating that the significand 230 has no leading zeroes. After the FNORM instruction is executed, the encoding of the number is unchanged, because the number is already in normal format. New sign bit 240 of the number in register R2 is still zero, new exponent 250 is unchanged, new explicit bit 260 is still set to one, and the new significand 270 has not been changed.

In the preferred embodiment, the floating point number which FNORM operates on has a 64 bit mantissa and a 15 bit exponent. However, one skilled in the art will appreciate that the FNORM instruction is not limited to numbers with any particular number of bits in the exponent or mantissa fields.

Figure 3:
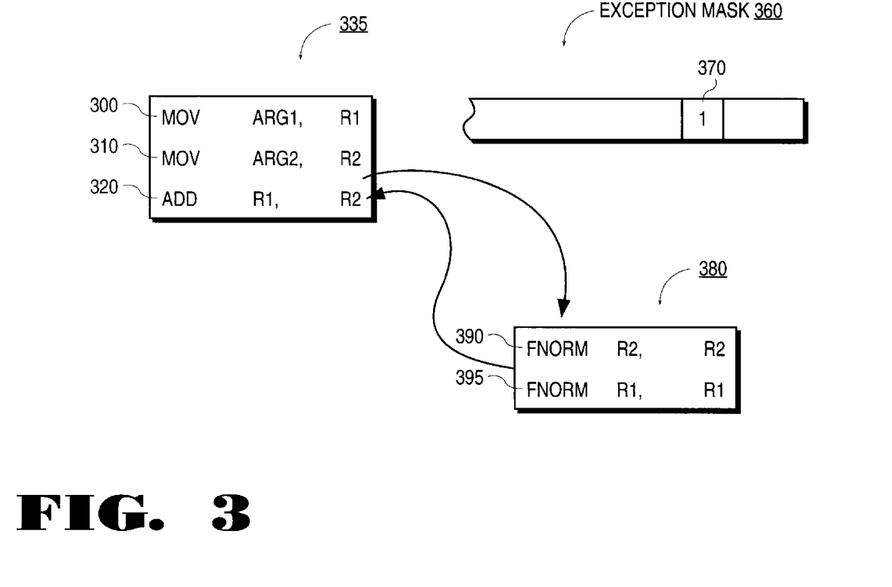
FIG. 3 shows the FNORM instruction of the present invention used within exception handler.

FIG. 3 shows the FNORM instruction of the present invention used within an exception handler. The instructions of a computer program are contained in a computer memory 335. The first MOV instruction 300 moves a first number, denoted by the symbol ARG1, from computer memory to register R1. The second MOV instruction 310 moves a second number, denoted by the symbol ARG2, from computer memory to register R2. ADD instruction 320 then adds the contents of registers R1 and R2 and places the result in register R2. If ARG1 or ARG2 is a denormal number, then a denormal operand exception is incurred. The denormal operand exception is incurred because denormal operand exception bit 370 in the exception mask 360 is set. When denormal operand exception bit 370 is set in exception mask 360, then exceptions are unmasked and will be taken whenever a denormal operand is encountered by an instruction. When the exception occurs, execution branches to exception handler 380. Exception handler 380 comprises a series of instructions contained in a different portion of computer memory than the portion of computer memory 335 containing the instructions of the program. The exception handler 380 contains FNORM instructions 390, 395 which normalize the contents of the registers which cause the exception, which in FIG. 3 is either register R1, register R2, or both. Exception handler 380 may also contain other instructions which are not shown in FIG. 3 and which are not necessary for the practice of the invention. Once the exception handler 380 completes, control is returned to the instruction which caused the denormal operand exception, which in FIG. 3 is ADD instruction 320.

In FIG. 3, the FNORM instruction is not placed sequentially in-line with the other instructions of the program, as it was in FIG. 1A. Instead, the FNORM instruction is placed within exception handler 380, and so is called when a denormal operand occurs, triggering the denormal operand exception and vectoring to exception handler 380. When denormal operands are encountered only rarely, removing FNORM from in-line with the program code substantially increases the performance of the program, because the overhead associated with occasionally vectoring to exception handler 380 is minimal compared to the overhead of executing the FNORM instruction in-line each time an operand is loaded from memory (see FIG. 1A). In programs where the probability of encountering denormal operands is very large, improved performance can be achieved by placing the FNORM instructions in line for each operand which is loaded to a register from memory, as is done in FIG. 1A. For programs where the probability of encountering denormal operands is small, it is desireable to place the FNORM instruction within the denormal operand exception handler, and then unmasking the denormal operand exception.

Figure 4:
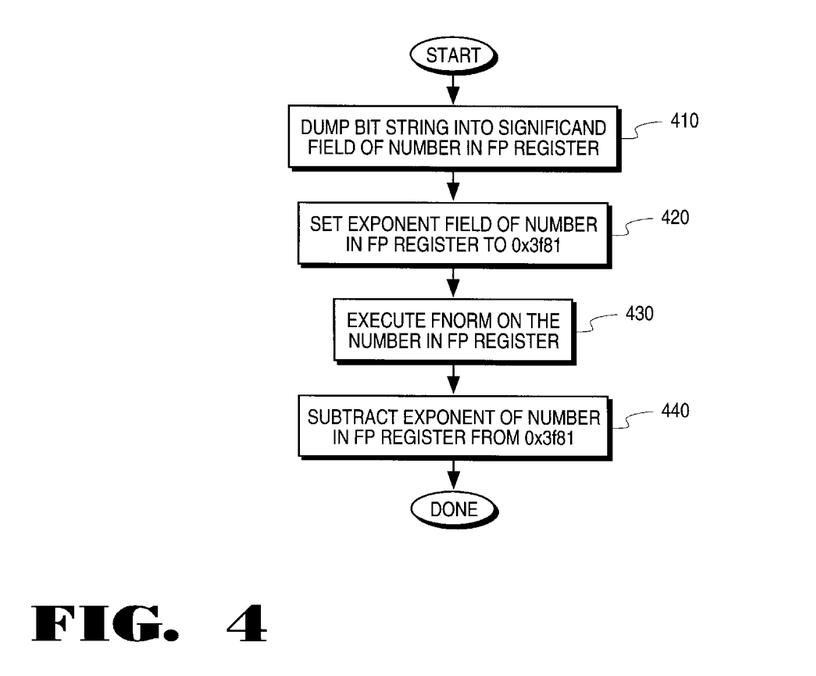
FIG. 4 shows a method using the FNORM instruction to implement a Find First Set Bit operation in a computer system.

A method using the FNORM instruction to implement a Find First Set Bit operation in a computer system is shown in FIG. 4. The Find First Set Bit operation determines the index of the first bit which is set to one in a bit string, and returns the index of this bit. By complementing the bit stream before calling Find First Set Bit, the index of the first bit set to 0 may be determined. The Find First Set Bit operation is useful in in applications such as database searches, population counts, and cryptography. The index of the first set bit in a bit stream which is returned by Find First Set Bit is also an indication of the number of leading zeroes in the bit string.

The first step 410 toward implementing the Find First Set Bit operation is to dump the bit string into the significand field (including the explicit bit) of a floating point register. In the preferred embodiment, the significand field of the register is 64 bits, therefore, the bit string to analyze can be a maximum of 64 bits in length. Dumping the bit stream into the significand field of the register cannot be performed using a typical MOV instruction, because a typical MOV instruction moves an entire floating point number to a register, including sign and exponent fields. Rather, the significand field of the register should be set independently of the sign and exponent fields, using either a special instruction or other means within the floating point processor. Once the bit string is dumped 410 into the significand field of a register, the next step is to set 420 the exponent field of the floating point register to a value which is recognized as a redundant encoding of a denormal number. The value 0x3F81, used in FIG. 4 step 420, is exemplary of such a value, and represents the difference between the minimum exponent value of a single-precision number and the exponent bias of the unified format. In the preferred embodiment, the value 0x3C01 may also be used for the value of the exponent, representing the difference between the minimum exponent value of a double-precision number and the exponent bias of the unified format. The important consideration is not the specific value of the exponent but rather that the exponent is set to a value which is recognized as the exponent of a redundant encoding of a denormal number in the unified format. At step 430 the FNORM instruction is executed on the value in the floating point register. Because the exponent has been set to one of the values which FNORM recognizes as a redundant encoding, the FNORM instruction will eliminate leading zeroes from the significand and adjust the exponent appropriately. For each position which the significand is left shifted, the exponent is decremented by one. The final step is to subtract 440 the exponent of the normalized value in the register from the value of the exponent set in step 420, which is the exemplary value 0x3F81 in FIG. 4. The difference between the two exponent values is the number of left-shifts required to normalize the number, which in turn is indicative of both the position of the first set bit in the bit string and also the number of leading zeros in the bit string.

A Find First Not Set Bit operation may be implemented in a similar manner, by complementing the bit string which is dumped into the significand field of the register. The FNORM instruction is then used as in FIG. 4 to locate the first set bit in the bit string. Because the bit string has been complemented, the location of the first set bit in the complemented bit string is also the location of the first not set bit in the original bit string.

Figure 5:
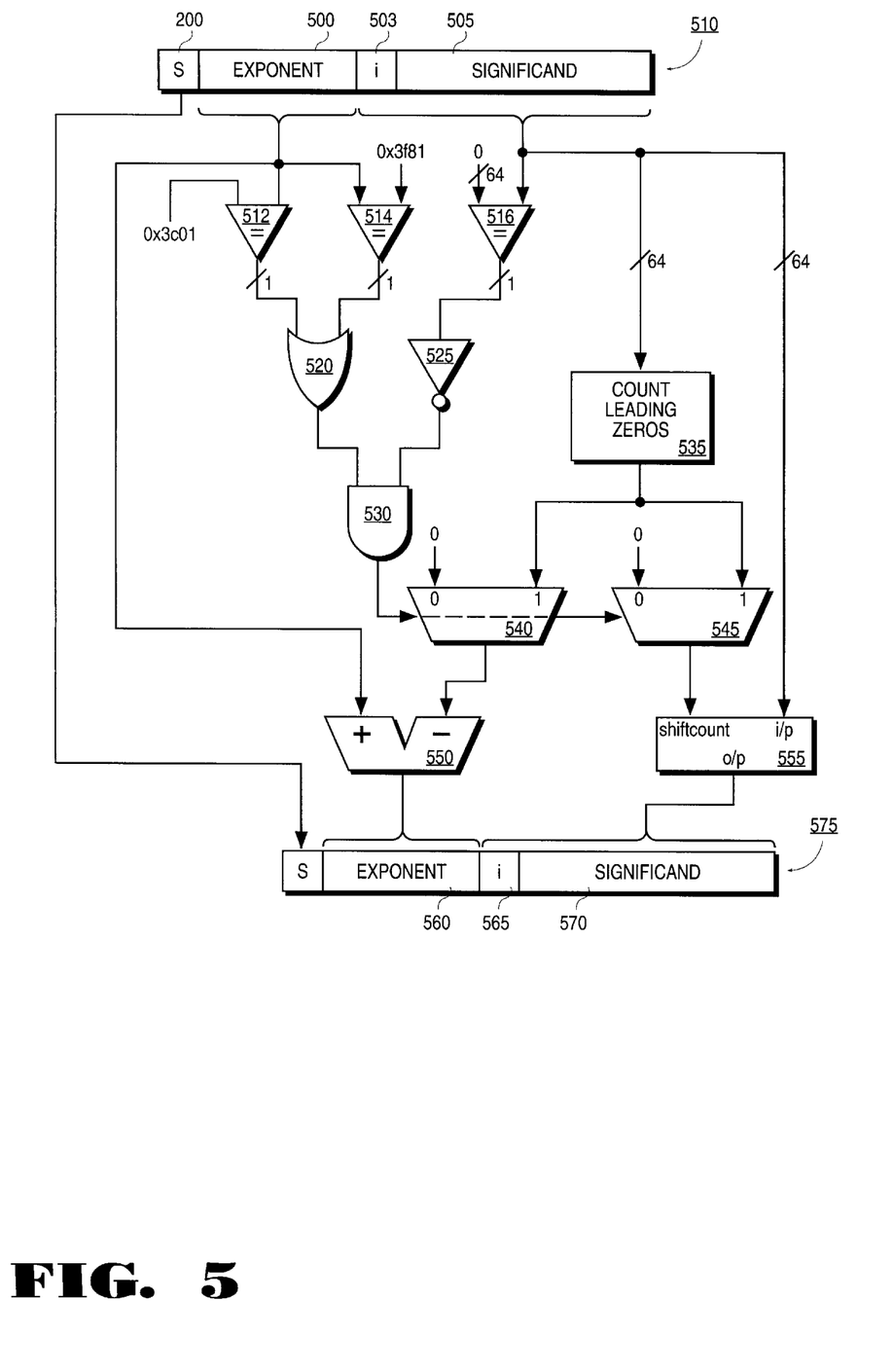
FIG. 5 shows a circuit for implementing the FNORM instruction of the present invention.

FIG. 5 shows a circuit for implementing the FNORM instruction of the present invention. Floating point register 510 comprises a sign bit S, an exponent field 500, an explicit bit 503, and a significand field 505. The exponent field 500 is passed to comparator 512 which compares the value of the exponent 500 with one of the values which indicates a redundant denormal encoding. In FIG. 5, the value 0x3C01 is the exponent value of a redundantly encoded denormal number originating from the double precision format. The exponent field 500 is also passed to comparator 514 which compares the exponent field 500 with the value 0x3F81. The value 0x3F81 is the exponent value of a redundantly encoded denormal number originating from the single precision floating point format. The result of these two comparisons is passed to OR circuit 520. If the exponent is either one of the special values indicating a redundant denormal encoding, OR gate 520 asserts its output. The output of OR gate 520 is passed to AND gate 530. The other input to AND gate 530 is the inverted result of comparing the significand field 505 with all zeroes, which is accomplished by comparator 516. If the significand field 505 is all zeroes, then the output of the comparator 516 is asserted. This asserted output is inverted by inverter 525 which places the second input to AND gate 530 in the non-asserted state. The output of AND gate 530 is only asserted when the exponent field 500 is one of the special values indicating a redundant denormal encoding, and the significand field 505 is not all zeroes. If the significand field 505 is all zeroes, the number is a true zero and not a redundantly encoded denormal number.

The significand field 505 is also input to counting circuit 535 which counts the number of leading zeroes in the significand field 505. The output of counting circuit 535, indicating the number of leading zeros in the significand, is input to multiplexers 545 and 540. The output of AND gate 530 selects which input of multiplexers 545 and 540 is passed to the output of the multiplexers 545 and 540. If the output of AND gate 530 is asserted, indicating that the register contains a redundantly encoded, non-zero denormal number, then the count of leading zeroes is passed to the output of multiplexers 545 and 540. Otherwise, zero is passed to the output of the multiplexers. The output of multiplexer 540 is input to subtractor 550 and subtracted from the exponent field 500. The output of subtractor 550 is input to exponent field 560 of register 575. When the number in register 510 is a redundantly encoded denormal number, the new exponent field 560 is the value of the exponent field 500 reduced by the number of leading zeroes in the significand field 505. The significand field 505 is also input to left shifter circuit 555. The output of multiplexor 545 is also input to left shifter circuit 555, indicating the number of places which the significand field 505 should be left-shifted. If the number in register 510 is not a denormal number which is redundantly encoded, then the value 0 is input to left shifter circuit 555 and the significand is not left-shifted. Normal numbers, and denormal numbers which are not redundantly encoded (those denormal numbers which originate in the extended format, for example), are not left-shifted. When the number in register 510 is a redundantly encoded denormal number, the significand field 505 is left shifted by the number of leading zeroes in the significand field 505, and filled with zeros. The output of left shifter circuit 555 is placed into the new significand field 570 of register 575. The explicit bit, which although shown separately in FIG. 5 is actually part of the significand field 570, is also set along with the bits of the significand field 570.

Although this invention has been shown in relation to a particular embodiment, it should not be considered so limited. Rather, the invention is limited only by the scope of the appended claims.

What is claimed is:

1. An apparatus to normalize a floating point number in a unified format which is converted from an originating format, the apparatus comprising:

a first storage area to store a floating point number, the floating point number comprising an exponent field, a significand field and an explicit bit; and a circuit to normalize the floating point number comprising:

a detector coupled to the first storage area to detect a condition when the explicit bit is not set and the exponent field has a first predetermined value identifying a redundant denormal encoding of the floating point number in a unified format, the exponent field of the redundant denormal encoding in the unified format having an exponent value in the originating format equal to a sum of a minimum exponent value and an exponent bias in the unified format.

2. The apparatus of claim 1 in which the first predetermined value of the exponent field is 0x3F81.

3. The apparatus of claim 1 in which the first predetermined value of the exponent field is 0x3C01.

4. The apparatus of claim 1 further comprising a second storage area to contain a result of normalizing the floating point number comprised by the first storage area.

5. The apparatus of claim 1 wherein the circuit leaves the floating point number unchanged if the condition is not detected.

6. A computer system comprising:

a processor to execute an instruction to normalize a floating point number in a unified format which is converted from an originating format, the floating point number comprising an exponent field, a significand field and an explicit bit, the execution of the processor causing the processor to at least detect a condition when the explicit bit is not set and the exponent field has a first predetermined value identifying a redundant denormal encoding of the floating point number in a unified format, the exponent field of the redundant denormal encoding in the unified format having an exponent value in the originating format equal to a sum of a minimum exponent value and an exponent bias in the unified format; and a memory to store the instruction, the processor fetching the instruction from memory before executing the instruction.

7. The computer system of claim 6 in which the first predetermined value of the exponent field of the floating point number is 0x3F81.

8. The computer system of claim 6 in which the first predetermined value of the exponent field of the floating point number is 0x3C01.

9. The computer system of claim 6 in which the instruction further comprises a second operand to contain a result of normalizing the floating point number comprised by the first operand.

10. The computer system of claim 6 wherein the execution of the instruction by the processor leaves the floating point number unchanged if the condition is not detected.

11. A computer system comprising:

processor means to execute an instruction to normalize a floating point number in a unified format which is converted from an originating format, the floating point number comprising an exponent field, a significand field and an explicit bit, the execution of the processor causing the processor to at least detect a condition when the explicit is not set and the exponent field has a first predetermined value identifying a redundant denormal encoding of the floating point number in a unified format, the exponent field of the redundant denormal encoding in the unified format having an exponent value in the originating format equal to a sum of a minimum exponent value and an exponent bias in the unified format; and memory means to store the instruction, the processor means fetching the instruction from the memory means before executing the instruction.

12. The computer system of claim 11 in which the first predetermined value of the exponent field of the floating point number is 0x3F81.

13. The computer system of claim 11 in which the first predetermined value of the exponent field of the floating point number is 0x3C01.

14. The computer system of claim 11 in which the instruction further comprises a second operand to contain a result of normalizing the floating point number comprised by the first operand.

15. The computer system of claim 11 wherein the execution of the instruction by the processor leaves the floating point number unchanged if the condition is not detected.

16. A method of normalizing a floating point number in a unified format which is converted from an originating format in a computer system, the floating point number comprising an exponent field, a significand field and an explicit bit, the method comprising:

normalizing the floating point number, the normalizing comprising:

detecting a condition when the explicit bit is not set and the exponent field has a first predetermined value identifying a redundant denormal encoding of the floating point number in a unified format, the exponent field of the redundant denormal encoding in the unified format having an exponent value in the originating format equal to a sum of a minimum exponent value and an exponent bias in the unified format.

17. The method of claim 16 in which the first predetermined value of the exponent field is 0x3F81.

18. The method of claim 16 in which the first predetermined value of the exponent field is 0x3C01.

19. The method of claim 16 further comprising:

leaving the floating number unchanged if the condition is not detected.

20. A method of finding a location index for a set bit at a left-most position in a string of bits, the method comprising the steps of:

dumping the string of bits into a significand field of a floating point number, the floating point number further comprising an exponent field and an explicit bit;

setting the exponent field of the floating point number to a first predetermined value identifying a redundant denormal encoding of the floating point number;

normalizing the floating point number when the explicit bit is not set and the exponent field has a first predetermined value identifying a redundant denormal encoding of the floating point number, the normalizing step converting the exponent field to a normalized exponent value; and subtracting the normalized exponent value from the first predetermined value to obtain the location index.

21. The method of claim 20 in which the first predetermined value of the exponent field is 0x3F81.

22. The method of claim 20 in which the first predetermined value of the exponent field is 0x3C01.

* * * * *

UNITED STATES PATENT AND TRADEMARK OFFICE
CERTIFICATE OF CORRECTION

PATENT NO. : 6,154,760  
DATED : November 28, 2000  
INVENTOR(S) : Chiu et al.

Page 1 of 1

It is certified that error appears in the above-identified patent and that said Letters Patent is hereby corrected as shown below:

Claim 1,
Line 11, delete "in the originating format"
Line 11, after "minimum exponential value" insert -- in the originating format --

Claim 5,
Line 9, delete "in the originating format";
Line 10, after "minimum exponential value" insert -- in the originating format --

Claim 9,
Line 9, delete "in the originating format";
Line 10, after "minimum exponential value", insert -- in the original format --

Claim 13,
Line 10, delete "in the originating format";
Line 11, after "minimum exponential value", insert -- in the originating format --

Signed and Sealed this

Fifth Day of March, 2002

*Attest:*

*Attesting Officer*

JAMES E. ROGAN
*Director of the United States Patent and Trademark Office*